United States Patent

Maeck

[15] 3,658,467
[45] Apr. 25, 1972

[54] SYSTEM FOR TOTAL IODINE RETENTION

[72] Inventor: William J. Maeck, Idaho Falls, Idaho

[73] Assignee: The United States of America as represented by the United States Atomic Energy Commission

[22] Filed: July 28, 1969

[21] Appl. No.: 845,485

[52] U.S. Cl. .................................23/25, 23/216, 55/71, 55/75
[51] Int. Cl. ...........................B01d 53/34, B01d 53/16
[58] Field of Search ....................55/71, 75; 23/25, 216, 4

[56] References Cited

UNITED STATES PATENTS

| | | | |
|---|---|---|---|
| 2,994,577 | 8/1961 | Silverman | 23/25 |
| 3,018,159 | 1/1962 | Silverman | 23/25 |
| 3,033,642 | 5/1962 | Bukata et al. | 23/25 |
| 3,429,655 | 2/1969 | Case | 23/25 |

Primary Examiner—Earl C. Thomas
Attorney—Roland A. Anderson

[57] ABSTRACT

A method of absorbing and retaining air-borne inorganic iodine and organic iodine species by passing a gaseous stream containing these iodines through a filter bed of synthetic zeolite in a metal ion-exchanged form, which metal is reactive with iodine.

4 Claims, No Drawings

SYSTEM FOR TOTAL IODINE RETENTION

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Of considerable importance to safety in the field of atomic energy is the removal of air-borne radioactive iodines from the atmosphere to prevent contamination of surfaces whereupon the iodines may adhere and also to prevent ingestion by humans and animal life. These radioactive iodines, which include inorganic species such as elemental iodine and organic species such as methyl iodide, may be present in reactor containment vessels from normal reactor operation and in particular in the case of fuel element cladding failure and are present in dissolver off-gases from nuclear fuel reprocessing plants. These radioactive iodines are formed in the nuclear reactor fuel by the fission of the fuel material.

Methyl iodide, which generally comprises the major fraction of organic iodide in a loss-of-coolant accident containment environment, is believed to form when the fission product iodine is released from failed fuel and combines with methyl radicals ($CH_3^+$), the exact origin of which is still unresolved. However, they are believed to originate in traces of organic flux residual from the fuel manufacturing process. The largest fraction (about one-half) of the assumed 10 percent conversion of iodine to methyl iodide is believed to occur in the short period of time directly following clad failure while the iodine and methyl radical are in the reactor plenum.

These organic iodides are relatively stable and highly volatile and are thus particularly hazardous to human life.

Considerable research has been expended on methods of removing air-borne radioactive iodines from the atmosphere within a containment vessel and from nuclear fuel processing dissolver off-gases.

A number of media have been developed which are able to remove elemental iodine from gas streams but which are generally of no value for trapping and retaining the organic iodides.

Some of these media act as mechanical filters for particulate iodine and other radioactive solids or mists. Materials, such as copper and other metals which react with iodine, have been used to adsorb iodine which is not stopped by mechanical filtration. In some cases, the copper may be coated with silver or cupric sulfide.

Another type of material is silver nitrate supported upon an inert substrate. The silver nitrate reacts with iodine species to form silver iodide. Although this material adsorbs both inorganic iodine and organic iodides, it is inefficient for gas streams with high moisture content, especially when condensation occurs on the adsorbing media. Condensation washes the silver nitrate coating from the inert substrate to render it ineffective. The temperature range for silver nitrate supported on inert materials is limited to about 250° to 400° F. Nitric acid and water condense at 220° F. or below and at 413° F. the silver nitrate melts. Poor iodine adsorption efficiency results from either condition.

At present, the material most commonly used in cleanup systems for reactor containment atmospheres for fission products is charcoal which has been impregnated with iodine and potassium iodide. The charcoal adsorbs elemental iodine better than organic iodides. At ambient temperature and relatively low humidity, impregnated charcoal adsorbs and retains these iodine species well. However, at about 250° C., charcoal starts to desorb iodine and at about 300° C. will ignite. It is obvious that many conditions are possible in the containment vessel of a nuclear reactor or elsewhere where maximum adsorption and retention of elemental iodine and organic iodides are absolutely essential to human health and safety, yet where the atmosphere conditions are such that charcoal filters are not satisfactory.

SUMMARY OF THE INVENTION

I have discovered a method of adsorbing air-borne inorganic and organic iodine species which eliminates the above-described problems associated with the use of charcoal adsorbents and other materials. My discovery consists of passing the air or gaseous stream containing the iodine species through a filter of a synthetic crystalline aluminosilicate zeolite of the molecular sieve type which is in a metal ion-exchanged form, which metal is reactive with iodine — such as silver — whereby the elemental iodine and organic iodides are almost 100 percent adsorbed at temperatures up to 500° to 600° C. The material will retain adsorbed iodine at temperatures up to 1,000° C. In addition, retentions of greater than 99.98 percent have been measured for elemental iodine and for methyl iodide for a variety of conditions varying from dry flows at room temperature, dry flows at 500° C. and steam-air mixtures.

It is therefore one object of this invention to provide a method for adsorbing and retaining both inorganic and organic iodine species.

It is another object of this invention to provide a method for adsorbing and retaining iodines which will work equally well under both dry and humid conditions.

It is a further object of this invention to provide a method for adsorbing and retaining air-borne iodine species which uses an adsorbent material which is not flammable.

Finally, it is an object of this invention to provide a method of adsorbing and retaining inorganic and organic iodine species wherein iodine will not be desorbed at temperatures below about 1,000° C.

DESCRIPTION OF THE PREFERRED EMBODIMENT

These and other objects of the invention can be attained by passing air or a gaseous stream containing air-borne iodine through a filter bed of synthetic crystalline aluminosilicate zeolite of the molecular sieve type which is in the silver ion-exchanged form. This synthetic zeolite adsorbs both inorganic and organic iodine species, thus almost completely purifying the air of them.

Synthetic zeolites of the molecular sieve type may be used to practice this invention. The pore size of the zeolite must be large enough to permit the passage of iodine therethrough. One such zeolite having adequate pore size has the following general formula expressed in terms of mol fractions of oxides: $0.9 \pm 0.2\ M_{2/n}O: Al_2O_3: 2.5 + 0.5\ SiO_2: 0$ to $8\ H_2O$, where "M" represents a cation, for example hydrogen or a metal, and "$n$" its valence. This compound is known as zeolite X and is described and claimed in U.S. Pat. No. 2,882,244, issued Apr. 14, 1959 to R. M. Milton. Zeolite X is available commercially under the trade name of Linde Molecular Sieve 13X and was used in the experiments hereinafter described. The preferred physical form of the synthetic zeolite is granular.

The synthetic zeolite must be in a metal ion-exchanged form, which metal is known to be reactive with iodine. Examples of these metals are silver, mercury, thallium, lead and palladium. Of these metals, silver is the most reactive with iodine and is thus preferred for the synthetic zeolite. The synthetic zeolite material may be put in the silver form by passing an aqueous solution of silver ion-exchanged nitrate through a column of the zeolite material which is suspended in water. When the zeolite has all been converted, it is washed with water to free it of any excess silver nitrate and air dried.

The material may be placed into any type of filter bed which may be desired. In the experimental laboratory work the bed length was equal to or greater than the diameter of the bed. Beds which were four inches long by one inch in diameter were used to evaluate the present invention.

The following examples are given as illustrative of this invention and are not to be taken as limiting the scope or extent of the invention.

EXAMPLE I

A flowing stream of dry air containing 1 µg of elemental iodine tagged with $I^{131}$ per cubic foot was passed at a rate of 8 cubic feet per minute through a test bed of zeolite X in the silver ion-exchanged form prepared as hereinbefore described. The holdup time in the 1×4-inch bed was 17 microseconds and iodine retention was 99.98 percent, 0.02 percent of the iodine being adsorbed by a back up bed of KI-impregnated charcoal. By gamma scanning, it was determined that the iodine was adsorbed in a sharp band at the entrance of the bed. The band did not move and no iodine was desorbed during a 19-hour air purge at 25° C.

EXAMPLE II

As in Example I, a flowing stream of air containing elemental iodine was heated to 113° C. and passed through a bed of zeolite X in the silver ion-exchanged form heated to 95° C. 99.98 percent of the elemental iodine was adsorbed in a sharp band within the first one-half inch of the bed. A 20-hour, 100° C. air purge followed by a 12-hour purge with 262° C. air did not move the band or desorb any iodine from the bed.

EXAMPLE III

To study the adsorption and retention of the organic iodides on the molecular sieve bed, dry air, methyl iodide mixture was prepared and passed through a bed as described heretofore. The adsorption of methyl iodide from the 135° C. air was 99.99 percent in sharp band at the front of the bed. A 16-hour air purge at 145° C. followed by a 2.5-hour purge at 362° C. air failed to either move the band or desorb any iodine from the test bed.

EXAMPLE IV

To determine the high-temperature adsorption capabilities of the molecular sieve in the silver ion-exchanged form, a bed of the material was placed in a quartz tube in a tube furnace at 500° C. with an air-cooled backup charcoal bed located downstream. After heating the bed for 30 minutes, an air-helium-methyl iodide mixture was introduced. Greater than 99.9 percent of the iodine activity was adsorbed on the molecular sieve bed. At this temperature, it is believed that methyl iodide thermally decomposes to elemental iodine which is adsorbed on the bed.

EXAMPLE V

In order to determine the high-temperature desorption properties of the zeolite X material in the silver ion-exchanged form, some of the material was traced with $I^{131}$ and placed in a furnace. The sample was heated for 1-hour periods at 100° C. increments starting at 400° C. After each heating period, the material was removed from the furnace, cooled, and counted. The first loss of iodine occurred at 1,000° C. and was 5 percent. Desorption in a flowing air stream was determined in a similar manner using a 1-inch-diameter tube furnace at an air flow rate of 1 cubic foot per hour. The first loss of iodine occurred at 900° C. and was 2 percent.

It can be seen from the examples given that the material used in the present invention is very versatile in adsorbing and retaining both inorganic and organic iodine species. In addition to the filtration of reactor containment vessel air from both normal and abnormal operation and dissolver off-gases from nuclear fuel reprocessing the material of this invention would be very useful in air-sampling systems, in continuous air monitors, and in face masks. This method can also be useful in analytical studies where, because of its high absorptivity for all species of air-borne iodine, it may be used in conjunction with selective absorbers to differentiate between various iodine species. This may be accomplished by placing two or more adsorbents in tandem where the initial filters are specific for various inorganic iodine species, followed by a filter of the zeolite material in the silver ion-exchanged form, which adsorbs organic iodine species. Upon completion of adsorption, the filters would readily be separated and analyzed for their iodine levels.

It will be understood that the invention is not to be limited to the details given herein but that it may be modified within the scope of the appended claims.

The embodiments of the invention in which an exclusive property or privilege is claimed are defined as follows:

1. A method of removing air-borne inorganic and organic iodine species from a gaseous stream comprising: passing the gaseous stream containing said iodines through a filter bed of synthetic zeolite of the molecular-sieve type in a metal ion-exchanged form, said metal selected from the group consisting of silver, mercury, thallium, lead and palladium, whereby the iodines are adsorbed by the zeolite.

2. The method of claim 1 wherein the synthetic zeolite is zeolite X.

3. The method of claim 2 wherein the zeolite X is in the silver ion-exchanged form.

4. The method of claim 3 wherein the zeolite X is placed in the silver ion-exchanged form by passing an aqueous solution of silver nitrate through the zeolite X suspended in water until all the zeolite is converted to the silver ion-exchanged form, washing said zeolite with water until all the excess silver nitrate is removed and drying said zeolite.

* * * * *